April 10, 1928.
J. H. ASHBAUGH
1,665,901
SPEED REGULATOR SYSTEM
Filed Sept. 26, 1925
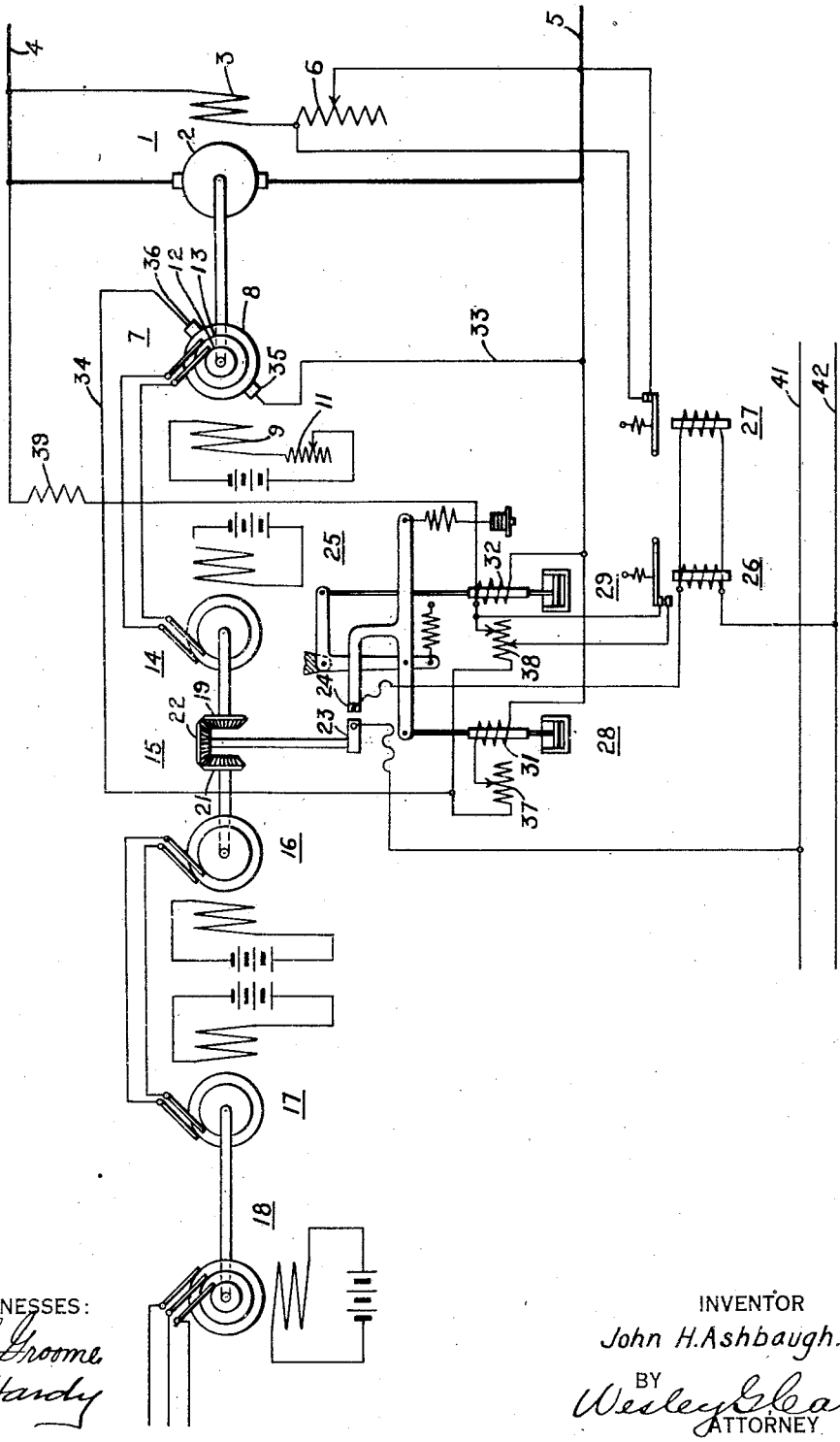
WITNESSES:
INVENTOR
John H. Ashbaugh.
BY
Wesley G. Carr
ATTORNEY Patented Apr. 10, 1928.

1,665,901

UNITED STATES PATENT OFFICE.

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed September 26, 1925. Serial No. 58,823.

My invention relates to regulator systems and more particularly to systems for regulating the speed of electric motors.

One object of my invention is to so regulate the speed of the controlled motor that it will follow the speed of a reference motor or clock device.

A further object of my invention is to provide a regulator of the above-indicated character in which the corrective tendency is cumulative, accurate, and quick acting.

My invention contemplates the use of a regulator of the vibratory type that intermittently short-circuits a resistor in series relation with a field winding of the controlled motor. The regulator comprises a pair of cooperating contact members, one of which is actuated by a pair of regulator magnets that are energized from a pilot generator driven in accordance with the speed of the controlled motor. The other regulator contact member is actuated by a differential device that is responsive to the speed difference between the controlled motor and a speed-reference means, such as a clock or a motor.

My invention will be better understood by reference to the accompanying drawing, wherein the single figure is a diagrammatic view of the apparatus embodied in a preferred form of the invention.

Referring to the drawing, a controlled motor 1 having an armature winding 2 and a field winding 3 is illustrated as connected to a suitable source of energy, such as supply conductors 4, 5. A variable resistor 6 is provided in series with the field winding 3, and a pilot generator 7 having an armature winding 8 and a field winding 9 is connected to be driven in accordance with the speed of the motor 1. A speed-adjusting rheostat 11 is provided in series with the field winding 9 of the pilot generator. The pilot generator 7 is further provided with a pair of slip rings 12, 13 so that alternating current may be taken from the generator; and a single-phase synchronous motor 14 is connected to be operated in accordance with the speed of the pilot generator 7 and, consequently, of the motor 1.

The synchronous motor 14 drives one side of a mechanical differential device 15, and a single-phase synchronous motor 16 is provided for driving the other side of the differential device. The synchronous motor 16 is actuated in accordance with the speed of a reference means, such as a clock, or a generator 17 that is driven by a three-phase synchronous motor 18. The differential device 15 comprises end or sun gear wheels 19 and 21, which are respectively driven by the motors 14 and 16, and a middle or planetary gear wheel 22, which is responsive to the differential speeds of the end gear wheels, and actuates a contact member 23 that cooperates with a contact member 24 of a regulator 25 so as to control relays 26 and 27.

The regulator 25 is of a well-known type and comprises a control magnet 28 and an anti-hunting magnet 29 that are respectively provided with coil windings 31 and 32, which are connected in parallel circuit relation to each other, and by means of conductors 33 and 34 to brushes 35 and 36 of the pilot generator 7. Resistors 37 and 38 are provided in circuit with the windings 31 and 32 of the regulator magnets 28 and 29, respectively. The regulator magnets are also connected through a resistor 39 to the armature of the controlled motor 1.

The operation of the regulator magnets 28 and 29 actuates the contact member 24 to engage and disengage the contact member 23, so as to connect the operating windings of the relays 26 and 27 with supply conductors 41 and 42. The normally open relay 26 operates to short-circuit a portion of the resistor 38 to prevent hunting action of the regulator 25, and the normally closed relay 27 is operative to intermittently short-circuit the resistor 6 in the field circuit of the controlled motor so as to govern the speed thereof.

The regulator 25 operates to maintain a constant voltage upon the pilot generator 7 by varying the excitation of the motor field winding 3 to govern the motor speed. The setting of the speed-adjusting rheostat 11 determines the particular speed of the pilot generator 7 that is necessary to produce the normal voltage for which the regulator 25 is adjusted, or that voltage which corresponds to the desired speed of the controlled motor 1.

Should the speed of the motor 1 correspond to that of the reference motor 18, so that the synchronous motors 14 and 16 operate at the same speed and hold the position of the contact member 23 constant, the control of the motor 1 would depend entirely upon the voltage impressed upon the regulator 25, and the operation of the regulator would be independent of the contact member 23. That is to say, the voltage of the pilot generator 7 would determine the operation of the regulator 25 in the same manner as though a fixed contact member 23 were used.

Should the speed of the motor 1 vary from that of the reference motor 18, however, the mechanical differential device 15 would cause the contact member 23 to be moved toward or away from the contact member 24, thereby necessitating a lesser or a greater movement of the contact member 24 to again close the circuit of the relays 26 and 27. Changing the position of the contact member 23, therefore, changes the setting of the regulator 25 or changes the voltage of the pilot generator that is necessary to cause the regulator to maintain a constant speed of the motor 1. This change in the setting of the regulator is very rapid and is cumulative in effect, so that the motor 1 will closely follow changes in speed of the reference motor 18 and will quickly adjust itself for changes in the excitation of field winding 3 as necessitated by changes in load.

Many modifications in the apparatus and in the arrangement of parts may be made within the spirit of my invention, and I do not wish to be limited other than by the scope of the appended claims.

I claim as my invention:—

1. In combination, a speed-reference means, a dynamo-electric machine having a field winding, means for regulating the excitation of said field winding comprising a pair of contact members, means for actuating one of said contact members in accordance with the speed of said dynamo-electric machine, and means for actuating the other of said contact members in accordance with the differential speeds of said speed-reference means and said dynamo-electric machine.

2. In combination, a speed-reference means, a dynamo-electric machine having a field winding, means for regulating the excitation of said field winding comprising a pair of contact members, a pair of electromagnets for actuating one of said contact members, means for energizing one of said magnets in accordance with the speed of said dynamo-electric machine, and means for actuating the other of said contact members in accordance with the differential speeds of said speed-reference means and said dynamo-electric machine.

3. In combination, a speed-reference means, a dynamo-electric machine having a field winding, means for regulating the excitation of said field winding comprising a pair of contact members, a pair of electromagnets for actuating one of said contact members, means for energizing one of said magnets in accordance with the speed of said dynamo-electric machine, and means for actuating the other of said contact members in accordance with variations in the speed of said dynamo-electric machine from its desired value.

4. In combination, a speed-reference means, a motor having a field winding, means for regulating the excitation of said field winding comprising a pair of contact members, a differential device responsive to the speeds of said reference means and said motor for actuating one of said contact members, and means for actuating the other of said contact members in accordance with the speed of said motor.

5. In combination, a speed-reference means, a motor having a field winding, means for regulating the excitation of said field winding comprising a pair of contact members, a differential device responsive to the relative speeds of said reference means and said motor for actuating one of said contact members, a pilot generator actuated by said motor, and means energized in accordance with the speed of said pilot generator for actuating the second of said contact members.

In testimony whereof, I have hereunto subscribed my name this 15th day of September, 1925.

JOHN H. ASHBAUGH.